(12) United States Patent
Kuehn

(10) Patent No.: US 6,715,275 B1
(45) Date of Patent: Apr. 6, 2004

(54) HAY RAKE TWIN TOOTH WITH CONTINUOUS CAMBER AND LOST-MOTION ACTIVATION AND A RAKE WHEEL USING THE SAME

(75) Inventor: Gregory C. Kuehn, Park Rapids, MN (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 09/761,525

(22) Filed: Jan. 16, 2001

Related U.S. Application Data
(60) Provisional application No. 60/213,454, filed on Jun. 22, 2000.

(51) Int. Cl.[7] .................. A01D 76/00; A01D 78/00; A01D 80/00; A01D 84/00
(52) U.S. Cl. ...................... 56/400; 56/400.21
(58) Field of Search ............ 56/377, 379, 400, 56/400.16, 400.21; 122/371; D8/13

(56) References Cited

U.S. PATENT DOCUMENTS

| | | |
|---|---|---|
| RE2,156 E | 1/1866 | Pratt |
| 283,324 A | 8/1883 | Carr |
| 915,476 A | 3/1909 | Pomeroy |
| 1,497,526 A | 6/1924 | Martin |
| 1,631,455 A | 6/1927 | Bamford et al. |
| 2,751,741 A | 6/1956 | Carson |
| 2,851,846 A | 9/1958 | Van der Lely et al. |
| 2,867,965 A | 1/1959 | Goodall et al. |
| 2,874,529 A | 2/1959 | Van der Lely et al. |
| 2,908,129 A | 10/1959 | Van der Lely et al. |
| 2,908,130 A | 10/1959 | Van der Lely et al. |
| 2,909,023 A | 10/1959 | Van der Lely et al. |
| 2,909,024 A | 10/1959 | Van der Lely et al. |
| 2,909,888 A | 10/1959 | Van der Lely et al. |
| 2,926,481 A | 3/1960 | Van der Lely et al. |
| 2,932,148 A | 4/1960 | Van der Lely et al. |
| 3,010,526 A | * 11/1961 | Van Der Lely et al. .... 172/543 |
| 3,057,145 A | 10/1962 | Van der Lely |
| 3,066,470 A | 12/1962 | Johnston |
| 3,120,092 A | 2/1964 | Van der Lely |
| 3,127,727 A | 4/1964 | Van der Lely |

(List continued on next page.)

FOREIGN PATENT DOCUMENTS

| | | | | |
|---|---|---|---|---|
| AT | 225991 | * | 6/1962 | ................ 56/377 |
| DE | 1800467 | * | 3/1978 | ................ 56/377 |
| FR | 1251478 | * | 12/1960 | ................ 56/377 |
| FR | 1350441 | * | 3/1963 | ................ 56/377 |
| GB | 800021 | * | 8/1958 | ................ 56/377 |
| GB | 920767 | * | 3/1963 | ................ 56/377 |
| IT | 615892 | * | 1/1961 | ................ 56/377 |
| SE | 181361 | * | 11/1962 | ................ 56/377 |

OTHER PUBLICATIONS

G.W. Giles, A Progress Report on the Finger Wheel Rake, May 1951, Dept. of Agricultural Engineering N.C. Agricultural Experiment Station, Information Circular No. 4, 23 pages.*

Primary Examiner—Árpád Fábián Kovács
(74) Attorney, Agent, or Firm—Sturm & Fix LLP

(57) ABSTRACT

A twin rake tooth includes a shank and working arc within each tooth which cooperate with ordinary rake wheels having rims. The shank within each tooth may have a slight camber which serves to stiffen the tooth against normal operational forces, but which allows the tooth to flex significantly when overloaded, through a lost-motion activation that occurs in cooperation with the rake wheel rim. In addition, the tooth has a generally smooth transition from one region of the tooth to the next, with no sharp bends, thereby substantially reducing any concentration of stress within the tooth.

19 Claims, 2 Drawing Sheets

U.S. PATENT DOCUMENTS

| | | |
|---|---|---|
| 3,218,791 A | 11/1965 | Van der Lely et al. |
| 3,226,922 A | 1/1966 | Luther et al. |
| 3,253,394 A | 5/1966 | Johnston et al. |
| 3,376,697 A | 4/1968 | Perold |
| 3,401,515 A | 9/1968 | Eishbaugh |
| 3,447,295 A | 6/1969 | Van der Lely |
| 3,481,125 A | 12/1969 | Miller |
| 3,553,950 A | 1/1971 | Waser |
| 3,561,206 A | 2/1971 | Fuller et al. |
| 3,589,112 A | 6/1971 | Frohmader |
| 3,706,191 A * | 12/1972 | Barbot .................. 56/377 |
| 3,771,303 A | 11/1973 | Van der Lely et al. |
| 4,015,411 A | 4/1977 | van der Lely et al. |
| 4,324,093 A * | 4/1982 | van der Lely et al. ........ 56/377 |
| 4,473,994 A | 10/1984 | Hein |
| 4,481,758 A | 11/1984 | Fishbaugh |
| 4,947,631 A | 8/1990 | Kuehn |
| 5,065,570 A | 11/1991 | Kuehn |
| 5,546,739 A | 8/1996 | Hettich |
| 5,960,620 A * | 10/1999 | Wright et al. .................. 56/377 |

\* cited by examiner

HAY RAKE TWIN TOOTH WITH CONTINUOUS CAMBER AND LOST-MOTION ACTIVATION AND A RAKE WHEEL USING THE SAME This application claims priority to U.S. Provisional Application Ser. No. 60/213,454 filed Jun. 22, 2000.

BACKGROUND OF THE INVENTION

1. Field of the Invention

This invention pertains generally to harvesting equipment, and more specifically to a rake tooth structure which has advantageous application to ground-driven rake wheels which are also referred to as horse rakes. Most specifically, the inventive rake tooth is used in combination with rake wheels having rims or hoops, which are commonly used to rake hay and other ground crops.

2. Description of the Related Art

In the handling of agricultural crop, it is common practice to cut the crop during a first pass through the field. During a subsequent pass, the crop will be raked into windrows. After the crop has had sufficient time to dry, then it is normally harvested.

With many agricultural crops, moisture content at the time of harvest is very consequential. Too much moisture will lead to the growth of various micro-organisms that can degrade or even poison the crop. Too little moisture often results in a lower quality product. Frequently then, there is a relatively narrow window of time within which the crop will be desirably harvested, and most desirably this moisture content will be as consistent throughout the crop as reasonably achievable. Once the crop has dried properly, then time is of the essence and the crop must be raked into a windrow efficiently, preparing for the harvesting machine.

In order to reduce the amount of labor and fuel needed to harvest a crop, and thereby improve the efficiency and lower the cost of production, machines have been developed and refined which vastly reduce the time required within a given field to accomplish the work. Regarding the raking of crop and the turning of windrows, various rakes have been devised through time that originally were pulled by animal and more recently by machine which will move and turn the crop with a minimum of direct human intervention. A large number of these machines are illustrated by Cornelis van der Lely and associates in U.S. Pat. Nos. 2,851,846; 2,874,529; 2,908,129; 2,908,130; 2,909,023; 2,909,024; 2,909,888; 2,926,481; 2,932,148; 3,057,145; 3,120,092; 3,127,727; 3,218,791; 3,447,295; 3,771,303; and 4,015,411; the contents of each which are incorporated herein by reference for their teachings of rakes. The majority of these rakes utilize rake wheels having a plurality of teeth upon each wheel. The wheels are pulled in a direction between their rotational and radial axes, which leads to interaction with the ground and subsequent rotation of the wheel. Any crop which contacts the teeth is swept to the side by the rotating rake wheel. With larger and more powerful machines, a plurality of rake wheels may be used to sequentially interact with the crop, to sweep it progressively farther to the side. A larger area may be raked in a single pass, thereby reducing the number of passes that must be made across the field, and consequently lowering the costs of fuel and labor. Nevertheless, the rake is somewhat limited in application, to crops and fields which do not excessively wear or damage the teeth.

While many crops or crop residues might desirably be raked by these rake wheels, equipment suitable for raking has heretofore only been available for crops such as alfalfa, hay or straw. In part this is due to the rake teeth, and the arrangement of wheels adjacent each other. For optimum raking efficiency, it is desirable to place the rake wheels closely adjacent each other. However, when an obstacle is encountered, a rake tooth may be deflected beyond elastic limits, and may then protrude from the rake wheel in a direction which interferes with an adjacent rake wheel. When this happens, the rake tooth will be further damaged or broken, and the adjacent rake wheel may also be damaged. As if that were not bad enough, the location of the broken tooth may not be immediately apparent, and may in fact not be discoverable. The tooth may remain in the windrow and may later be picked up by subsequent harvesting equipment. Steel is much harder than agricultural crop, and, should the steel rake tooth be picked up by the harvesting equipment, that equipment maybe seriously damaged.

In order to limit the amount of motion of a rake tooth out of the desired plane of rotation, van der Lely and others have devised various rims or hoops which encircle the rotary hub of the rake wheel. These rims help to maintain the correct spacing and position of each tooth, while still enabling the use of a large rake wheel. A large wheel is advantageous in the raking process to minimize the effects of unevenness in the field surface, enable adequate rotation of the ground-driven rake wheel, and enable significant movement of the crop perpendicular to the direction of travel of the towing tractor or similar agricultural vehicle. Progress has also been made in the hub structure itself, which enables replacement of rake teeth in many of the more modern designs.

While these rims which are concentric about the hub assist in maintaining tooth spacing, other problems have been identified by the present inventor. More particularly, in the prior art the teeth are effectively mechanically anchored at the rim, and undesirable stress is developed within the tooth in the region adjacent the rim. Consequently, when a rock, root or other hazard is encountered, all too often the stress induced in the tooth adjacent the rim is sufficient to exceed the elastic limit of the tooth, leading to the catastrophic failure described herein above, where the tooth will either immediately break or, worse, become entangled in an adjacent rake wheel.

Van der Lely and others were aware of this problem, but were unable to solve it. In fact, a number of the van der Lely patents referenced hereinabove are directed towards resolving this very issue. Changes to the tooth geometry, tooth length, method of attachment at the hub and at the ring, and other similar approaches have been proposed. Carr in U.S. Pat. No. 283,324; Pomeroy in U.S. Pat. No. 915,476; Martin, in U.S. Pat. No. 1,497,526; Bamford et al in U.S. Pat. No. 1,631,455; and Perold in U.S. Pat. No. 3,376,697; each incorporated herein by reference, illustrate various tooth geometries intended to reduce breakage or otherwise improve performance. Coils such as illustrated by Carr, Pomeroy and Bamford et al do not entirely eliminate the concentration of stress, and the coil tends to add significant, undesirable cost to the tooth and rake wheel. Sharp bends, regardless of location, even when adjacent the bolt such as illustrated by Martin, concentrate stresses within the tooth. Goodall et al in U.S. Pat. No. 2,867,965, also incorporated herein by reference, illustrates an alternative to the rims and hoops of the prior art. Johnston in U.S. Pat. Nos. 3,066,470 and 3,253,394; Luther et al in U.S. Pat. No. 3,226,922; Fishbaugh in U.S. Pat. Nos. 3,401,515 and 4,481,758; Miller in U.S. Pat. No. 3,481,125; Waser in U.S. Pat. No. 3,553, 950; Fuller et al in U.S. Pat. No. 3,561,206; and Hein in U.S. Pat No. 4,473,994 all incorporated herein by reference, illustrated elastomeric connections between rims and teeth. The elastomeric material is intended to absorb stresses without exceeding the elastic limits of the rake teeth. While this approach does tend to reduce stress in the steel tooth, a tooth including the elastomeric material is far more expensive to manufacture, and is still prone to separation of the elastomer. Furthermore, aging sometimes leads to separation, independent of loads encountered in the field. Furthermore, the elastomeric material may actually allow the tooth to move out of the desired rotary path, and thereby adversely bind with adjacent rake wheels. In spite of the alterations proposed by these myriad patents on rake wheels, none has proven to be completely satisfactory. Consequently, rake teeth remain prone to undesirable breakage, leading to associated lost time spent in repair instead of raking. This slows the use of the rake in fields which present hazards that pose a thread to the rake teeth.

What is desired then is an improved rake wheel which overcomes the disadvantages of the prior art while not sacrificing the beneficial features of current rake wheels.

SUMMARY OF THE INVENTION

In a first manifestation, the invention is a rake tooth adapted for use in a ground-driven rake wheel having a rim concentric about a hub through which the rake tooth may pass. The rake tooth is configured to accommodate a variety of rim diameters and designs to allow ready repair and replacement of other diverse rake teeth. It has a first end attachable to a hub and a first leg extending therefrom. A working point forms the terminus of the first leg. A shank extends lengthwise from the first end towards the working point and has a general camber therein in a first direction of revolution forming an overall radius of curvature along its length. A working arc is between shank and working point, and has a general camber therein in a second direction of revolution forming an overall radius of curvature smaller than the overall radius of curvature of the shank.

In a second manifestation, the invention is a rake wheel for operative use in a ground-driven agricultural rake. The rake wheel has a central shaft, a hub rotationally mounted on the central shaft, a plurality of rake teeth attached to and extending from the hub and terminating in a plurality of working points, and a rim circumscribing the hub throught which rake teeth pass. A shank within each rake tooth extends lengthwise from the hub generally towards the working oint, and has a general camber in a first direction of revolution forming an overall radius of curvature. A working arc within each rake tooth extends between the shank and working point. The working arc has a general camber in the same direction of revolution as the shank, and forms an overall radius of curvature smaller than the overall radius of curvature of the shank.

OBJECTS OF THE INVENTION

A first object of the invention is to provide a rake tooth geometry which, through geometry alone, will resist breakage when a hazard is encountered. A second object of the present invention is the provision of a relatively simple geometry which is readily manufactured at low cost, most preferably at or lower than the cost of existing rake teeth. A third object of the invention is to accommodate existing rakes and rake wheels, and co-exist with adjacent rake wheels, whether outfitted with like rake teeth or not. Another object of the invention is to provide a rake tooth which is free of crop entanglement. A further object of the invention is the provision of a rake tooth which may be used with heavier, stronger, or more largely and deeply rooted forage crops. These and other objects are achieved in the preferred embodiment, which is explained in the following description and best understood when considered in conjunction with the appended drawing figures.

DESCRIPTION OF THE PREFERRED EMBODIMENT

Figure 1:
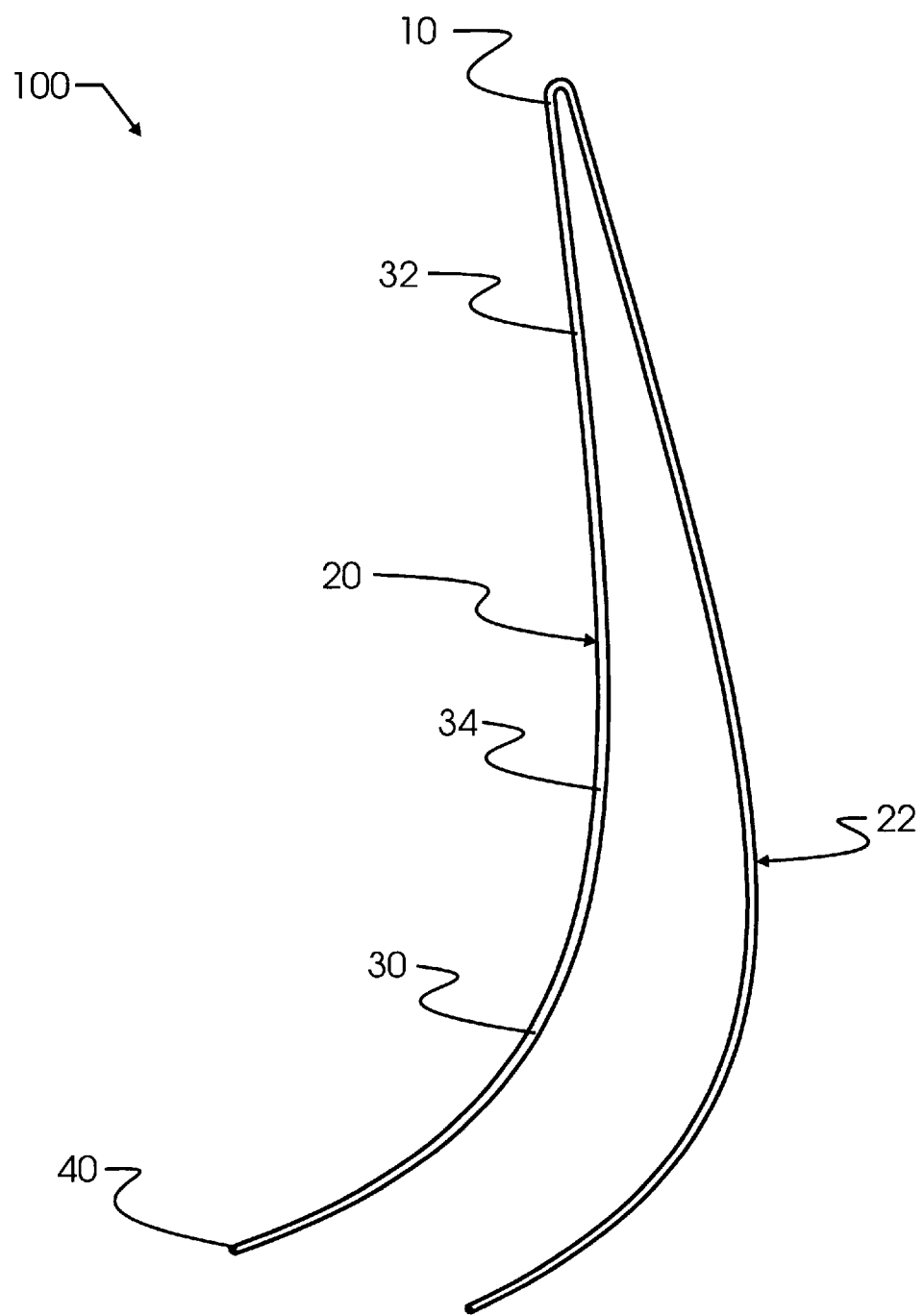
FIG. 1 illustrates a preferred embodiment rake tooth designed in accordance with the teachings of the present invention from a plan view.

The preferred embodiment camber twin rake tooth 100 illustrated in FIG. 1 is most preferably formed from a single continuous material. While the material is not limited by the present disclosure to one or a specific family of materials, it will be understood that the tooth will be ground-engaging, and so must be resilient, resistant to abrasion, withstand high tensile and yield forces, and most preferably be manufactured easily and at low cost. Various steel compositions, ranging from mild steel and carbon steel to specialty heat-treated materials and various alloys will be acceptable in the practice of the present invention, particularly steel wire, as will other materials not specifically mentioned herein, while still preserving reasonable manufacturing costs and high performance. For the purposes of this disclosure, wire will be defined to be material which has been drawn into the form of a thread or cord. The exact diameter is not critical, but in the preferred embodiment the wire may, for example, be approximately one-quarter of an inch in diameter. Smaller and larger diameters may be effective as well, dependent, of course, upon the exact composition of the material used to form the wire.

Twin tooth 100 is curved to contain two tooth points 40 opposite an apex 10. Apex 10 is a hairpin bend of relatively small diameter which forms an acute angle between a first leading tooth leg 20 and a second trailing tooth leg 22. This design enables two tooth legs 20, 22 to be manufactured from a single wire, which simplifies production and also simplifies installation in the field, where two prior art teeth may be simultaneously replaced with a single twin tooth 100 of the present invention.

Between apex 10 and tooth point 40 on each tooth leg 20,22 are two distinct arcs of different radius. Working arc 30 is a section of tooth leg 20 having a relatively smaller radius. Agricultural crop will contact working arc 30 during raking, and be moved both in the direction of travel of a towing vehicle such as a tractor, and also in the direction of rotation of a rake wheel such as rake wheel 200 illustrated in FIG. 2. Tooth point 40 will most desirably not be pointed normal to the earth when under hub 75, as shown by point 60 of FIG. 2. This orientation angled to the ground minimizes digging of twin tooth 100 into the earth. As twin tooth 100 rotates farther in the direction of rotation R shown in FIG. 2, tooth point 40 does point downwards as it moves up and away from the ground a shown by point 80. This orientation shown at point 80 helps to release any agricultural crop that is traversed sideways by working arc 30.

Shank 32 most preferably forms an arc of much greater radius than the arc formed by working arc 30. Shank 32 may have a radius of curvature approaching a straight line, but preferably will be slightly curved. This gentle curve, or camber, of shank 32 may extend over any portion of shank 32, but will preferably extend from apex 10 to an interface 34 between working arc 30 and shank 32. Interface 34 can be a discrete point, but more preferably will be a transition region between the two different radiuses of curvature. Using a transition region helps to prevent any concentrations of stress within twin tooth 100, where an abrupt change might lead to undue stress at interface 34.

Twin tooth 100 may be readily manufactured from steel wire using a Diacro™ type bending tool as is commonly known in the metal-working trade. Most preferably, twin tooth 100 will be substantially planar, with tooth point 40, working arc 30 and apex 10 all existing within the same plane, essentially having a total thickness no greater than the thickness of the steel wire. This planar relationship is preferred for use with rake wheels such as rake wheel 200 of FIG. 2, to keep tooth 100 within the plane of rim 50, but additionally allows multiples of twin tooth 100 to be stored compactly. Therefore, while it is contemplated that other possible variants of the preferred embodiment have complex curves within each leg 20, 22 that are not coplanar, the benefits of these complex curves must be weighed against the simplicity of the preferred embodiment in production, distribution and storage.

Figure 2:
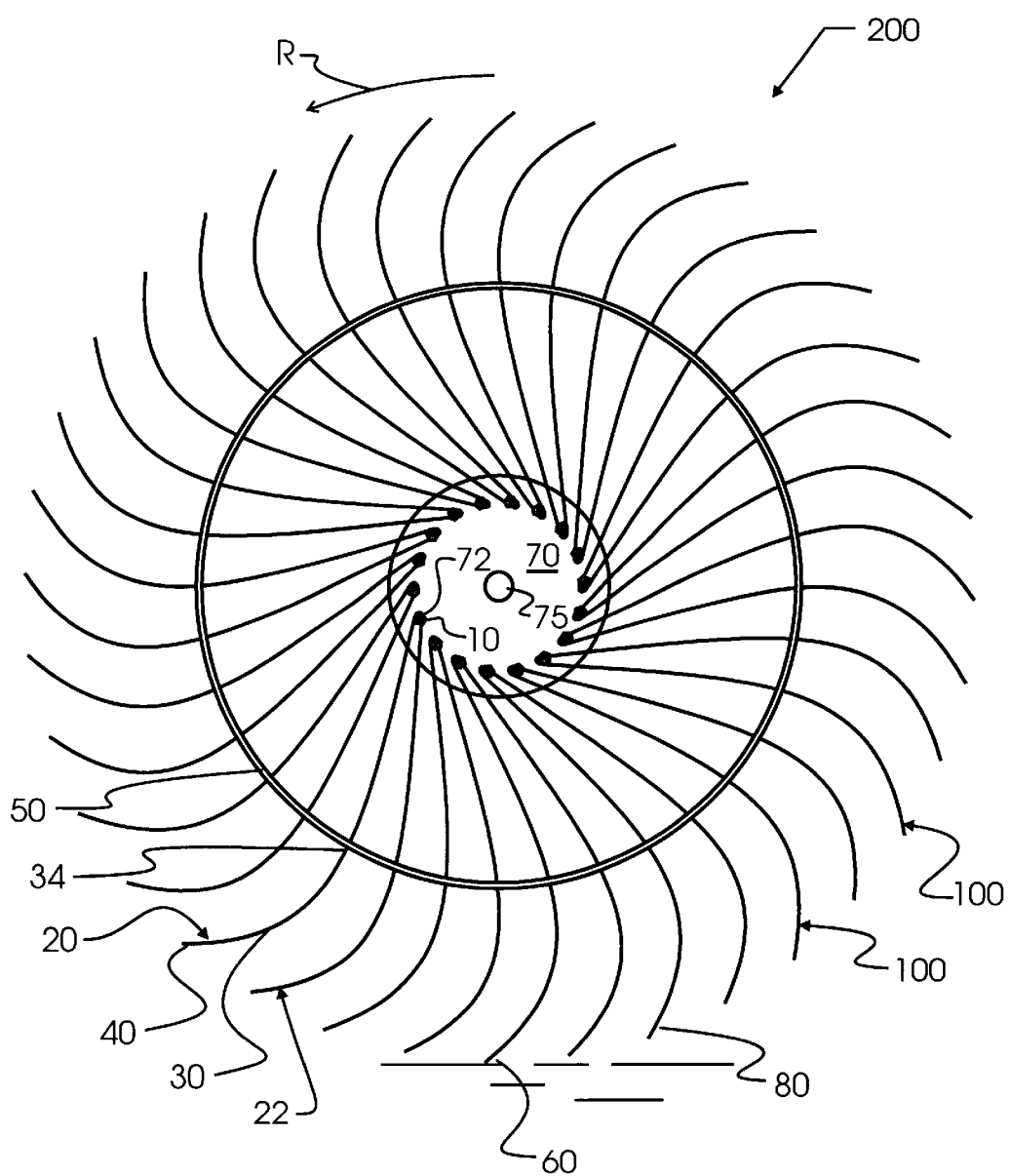
FIG. 2 illustrates the preferred embodiment rake tooth of FIG. 1 incorporated in a ground-driven rake wheel in accordance with the teachings of the present invention, from a side plan view.

As illustrated in FIG. 2, a plurality of twin teeth 100 are mounted about a central plate 70, and are attached thereto at their apex 10 to standard sized bolt 72. A bolt 72 is a preferred method of attachment, owing to the relative simplicity, but the invention is not restricted to any one method of attachment to central plate 70 and other techniques such as illustrated in the prior art would be satisfactory. Nevertheless, no special cover plate is required with the preferred embodiment.

Central plate 70 is designed to rotate freely about hub 75, and might commonly include bearings or bushings at the juncture therebetween. Concentric about central plate 70 and preferably co-axial with hub 75 is rim 50, through which each leg 20, 22 of twin tooth 100 passes. As shown for example by the van der Lely patents, rim 50 may take numerous forms and constructions to accommodate tooth 100. One preferred construction for rim 50 has holes extending radially, through which each leg 20, 22 is inserted.

In operation, rake wheel 200 will rotate in the direction indicated by arrow R in FIG. 2, and twin teeth 100 will progressively engage with the ground at point 60, and then lift off at point 80, where any agricultural material will be dropped. As known in the field, a second rake wheel may be provided adjacent rake wheel 200 to further move the crop.

In the event an obstacle is encountered, twin tooth 100 exhibits novel mechanical motion which protects tooth 100 and rake wheel 200 from damage that is otherwise encountered in the prior art. As aforementioned, shank 32 most preferably has a slight camber or curvature of larger radius but similar in direction to working arc 30. This slight radius serves to bias shank 32 against flexure when a hazard is first encountered, since the flexure of shank 32 would also require slight compression somewhere within tooth 100. In other words, when an obstacle is encountered, forces will be produced in a direction from point 40 that will tend to straighten working arc 30. These same forces will be levered through the pivot created by rim 50 to flex shank 32 out of the slightly curved position through a straight line. This would add length to shank 32, which would tend to extend tooth point 40 farther from central plate 70. In order to extend point 40, it must have some place to go, and with the hazard, it may frequently be held fixedly in position. In fact, many hazards may produce a force against point 40 tending to drive point 40 closer to central plate 70. The slight camber within shank 32 consequently tends to generate a force resisting straightening, and thereby resisting flexing, which in turn results in a stiffening of each of legs 20, 22 during normal operation when relatively light loads are applied against point 40.

However, when greater loads are applied, which in the prior art might concentrate stresses at a small local point within a tooth adjacent rim 50, the preferred embodiment twin tooth 100 will flex shank 32 opposite the direction of original camber or curvature, thereby causing leg 20 to have opposite directions of arc, such as found in the letter "s". This flexure relieves the stress that would otherwise have concentrated adjacent rim 50, and further allows working arc 30 to bend sufficiently to allow point 40 to pass over the hazard.

As can be seen in FIG. 1, the center point of radius for both shank 32 and working arc 30 in he unloaded state is to the left of the tooth. However, when tooth 100 is overloaded, the center oint of radius for shank 32 will pass from the left of tooth 100 in FIG. 1 to the right of tooth 100. The extra length required for this transition will typically come from a slightly greater compression, or reduction of radius of curvature, within working arc 30. When this occurs, there will be a sudden shift or snapping action, commonly referred to as a lost-motion or bi-stable activation.

As will now be apparent, the camber of shank 32 will directly impact the stiffness of legs 20, 22 and will also determine the load required to cause the lost-motion activation of shank 32 which converts legs 20, 22 into the opposite directions of curvature, or, roughly, "s" configuration. Most preferably, this will be designed so that legs 20, 22 are capable of being used with relatively heavy crop without unduly activating, thereby ensuring a complete raking of all crop on the ground. At the same time, the forces required for activation should not be allowed to be so great as to exceed the elastic limits of the material chosen for twin tooth 100. As should be apparent, the computations for the extent of camber within shank 32 will depend primarily upon the material selected for twin tooth 100 and secondarily upon the crop or anticipated loading for which the present invention is being designed.

An additional benefit of the preferred embodiment twin tooth 100 arises from differences among the various rake wheels of the prior art. There are many different rim diameters, and also different spacings between teeth passing through the rim. In addition, each rake wheel requires a tooth designed for that specific design. This requires manufacturers to maintain tooling for many years, to support the diverse rake wheels, and further requires distributors to warehouse very large quantities of relatively infrequently required teeth. In contrast, the preferred twin tooth 100 does not have a fixed point for engagement with rim 50, nor is one required. The camber, when as in the preferred embodiment one is provided, is preferably provided across the entire length of shank 32. The unloaded curvature is also in the same direction as the curvature of working arc 30. As a result, the location of rim 50 relative to interface 34, shank 32 or working arc 30 will not normally consequentially alter the performance described herein above. Therefore, the preferred embodiment twin tooth 100 will serve as a universal replacement tooth for a wide variety of rake wheels already in agricultural use.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

I claim:

1. A rake wheel adapted freely rotate in a direction of rotation resulting from contact with the ground when the rake wheel is towed along the ground in a direction of travel, the rake wheel comprising:

a center hub having an axis of rotation including tine attachment places forming a tine attachment circle thereon; an annular tine support band having a radial width and a plurality of openings therein; a plurality of tines disposed from a first end at the respective attachment place on the center hub to a terminating end in a plane substantially perpendicular to the axis of rotation of the hub, said tines extending outwardly from said first end from the tine attachment places on the center hub, past the tine support band to the terminating ends for contacting the ground, each of said tines including an inner segment operatively attached to the center hub, an intermediate segment and an outer segment, said outer segment being disposed radially outside of said annular support band; and wherein at least one portion of the outer segment of each respective tine is a curved segment, said at least one portion being spaced outwardly from the annular support band by a distance of at least the radial width of the annular tine support band; wherein the entire outer segment and intermediate segment of each respective tine includes no parts which are curved in more than one direction, when in a non-stressed condition; and wherein substantially all of the outer segment of each of the tines is disposed in front of a radial line that passes through the axis of rotation of the rake wheel and the respective attachment place for the respective tine with respect to the rotational movement of the tine in a raking direction.

2. The rake wheel of claim 1 wherein an inner part of the outer segment of each respective tine which is disposed between said one portion and said annular support band is also curved.

3. The rake wheel of claim 2 wherein the inner part of the outer segment of each respective tine is curved in the same direction as said at least one portion of the outer segment.

4. The rake wheel of claim 3 wherein said tines extend from the center hub substantially tantentially to the tine attachment circle.

5. The rake wheel of claim 1 wherein each of said tines has a configuration comprising only one gentle curve from a place on the intermediate segment to a place on the outer segment.

6. The rake wheel of claim 1 wherein at least one of said tines extends from the center hub of the rake wheel substantially tangentially the tine attachment circle;

wherein the circle formed through tine attachment places on a center hub of the rake wheel is disposed in a plane and substantially all of the tines extend radially outwardly from the respective attachment places of the tines is disposed in said plane; and wherein a straight line from the respective attachment place of said one tine and any point on the intermediate or outer segment of the respective tine will be disposed at an acute angle with respect to a radial line that passes through the axis of rotation of the rake wheel and the place of attachment of the respective tine.

7. The rake wheel of claim 1 wherein the intermediate segment of each respective tine extends from the inner segment of said respective tine to the outer segment of said respective tine.

8. The rake wheel of claim 7 wherein a transition portion of the intermediate segment of each respective tine passes through a respective one of said openings in the annular support band and such transition portion has a radius of curvature equal to more than said curved portion of the outer segment of the respective tine.

9. The rake wheel of claim 1 wherein the intermediate portion is not restrained from bending outside of said plane except for where the intermediate portion passes through the opening in the annular support band and the effect of attachment of the inner segment to the center hub.

10. The rake wheel of claim 1 wherein two adjacent tines are connected together on the inner segment ends thereof.

11. The rake wheel of claim 1 wherein said intermediate and outer segments of the tines are curved in the same direction.

12. The rake wheel of claim 11 wherein at least a portion of a first radius of curvature of the intermediate segment has a larger radius of curvature than at least a portion of a second radius of curvature of the outer segment when in a non-stressed condition.

13. The rake wheel of claim 12 wherein a gentle transition of a radius of curvature occurs in said tine in said intermediate segment between the first and second radii of curvature.

14. The rake wheel of claim 1 wherein there are no curved portions of radius less than ten times the diameter of said tine in operative contact with said annular tine support band thereby reducing a tendency for the tine to break close to said annular tine support band.

15. The rake wheel of claim 1 wherein the tine attachment circle is located adjacent an outside periphery of the center hub.

16. The rake wheel of claim 1 wherein at least a portion of the intermediate segment of the respective tine is disposed in front of said radial line.

17. The rake wheel of claim 1 wherein substantially all of each of the respective tines is disposed in front of the radial line that passes through the axis of rotation of the rake wheel and the respective attachment place for the respective tine with respect to the rotational movement of the tine in a raking direction.

18. The tine of claim 1 including a first one of said tines and a second one of said tines each having a first inner end, and wherein said second tine is substantially identical to the first tine, and a hairpin bend integrally connecting the first end of the first said tine and the first inner end of the second tine to thereby form a twin tine.

19. A rake wheel adapted to freely rotate in a direction of rotation resulting from contact with the ground when the rake wheel is towed along the ground in a direction of travel, the rake wheel comprising:

a center hub having an axis of rotation including tine attachment places forming a tine attachment circle thereon;

an annular tine support band having a radial width and a plurality of openings therein;

a plurality of tines disposed from a first end at the respective attachment place on the center hub to a terminating end in a plane substantially perpendicular to the axis of rotation of the hub, said tines extending outwardly from said first end from the tine attachment places on the center hub, past the tine support band to the terminating ends for contacting the ground, each of said tines including an inner segment operatively attached to the center hub, an intermediate segment and an outer segment, said outer segment being disposed radially outside of said annular support band; and wherein at least one portion of the outer segment of each respective tine is a curved segment, said at least one portion being spaced outwardly from the annular support band by a distance of at least the radial width of the annular tine support band;

wherein the entire outer segment and intermediate segment of each respective tine includes no parts which are curved in more than one direction, when in a non-stressed condition;

wherein substantially all of the outer segment of each of the tines is disposed in front of a radial line that passes through the axis of rotation of the rake wheel and the respective attachment place for the respective tine with respect to the rotational movement of the tine in a raking direction; and a first one of said tines and a second one of said tines each having a first inner end, and wherein said second tine is substantially identical to the first tine, and a hairpin bend integrally connecting the first end of the first said tine and the first inner end of the second tine to thereby form a twin tine.

* * * * *